Patented May 20, 1930

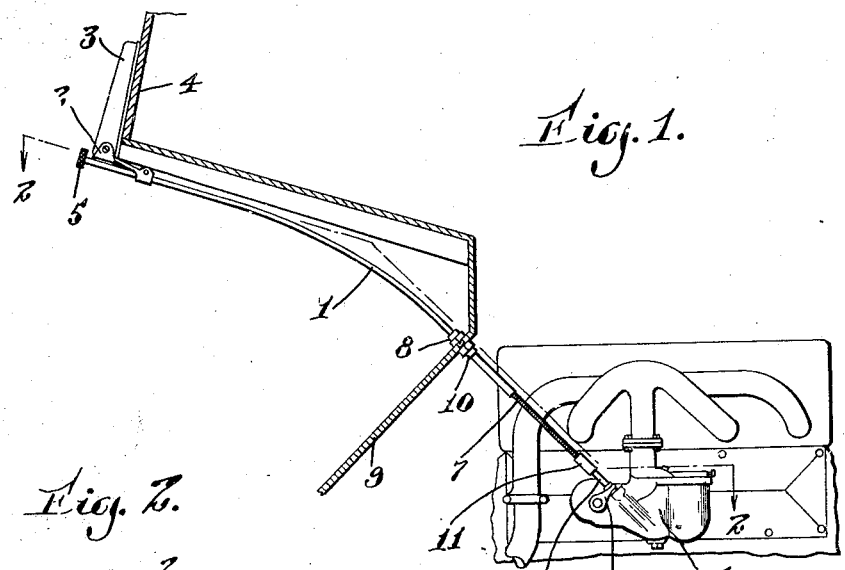
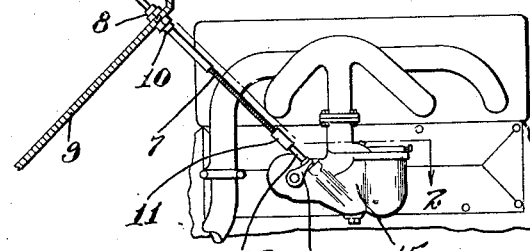
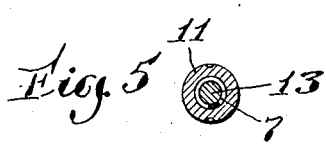
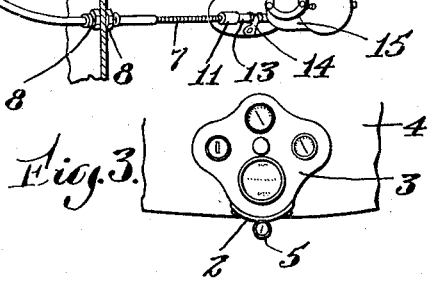
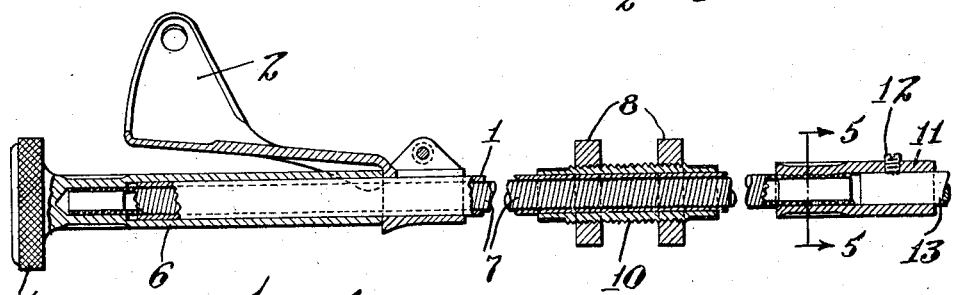

1,759,354

UNITED STATES PATENT OFFICE

ALFRED F. JACKSON, OF ATTLEBORO, MASSACHUSETTS, ASSIGNOR TO APCO MOSSBERG CORPORATION, OF ATTLEBORO, MASSACHUSETTS, A CORPORATION OF MASSACHUSETTS

CARBURETOR CONTROL

Application filed October 11, 1928. Serial No. 311,847.

My present invention relates primarily to carburetor controls for automobile engines, and more particularly to a combined rotary, reciprocating and off-set control for such engines.

My device, per se, is applicable to other uses and in other fields than illustrated, and it will be appreciated that I do not limit the invention to use with automobile engines, having shown the same as applied to an engine for illustrative purposes only.

An important object of the present invention is the provision of a remote control device which is laterally offset from the object to be controlled, such as a carburetor.

A further object is the provision of such a control that is flexible, and yet strong, rigid, rugged and durable.

Another object resides in the fact that my novel control is both rotary and reciprocating, accomplishing different results and performing different operations for each of said movements.

A still further feature of the invention resides in the fact that by utilizing such a flexible, rotary and reciprocating device, and by laterally offsetting same from the object to be controlled, the operating handle may be brought within easy reach of an operator. This is particularly true when the invention is applied to an automobile, such as a Ford, where, in prior devices, the carburetor control was located at the extreme right side of the dashboard, requiring that the operator reach from his position behind the steering wheel, across the right portion of the front seat, to make adjustments. This was awkward, as well as dangerous, since it prevented the driver from remaining in position to maintain proper control of the automobile. My invention eliminates this difficulty, disadvantage and danger by placing the control handle within easy reach of the driver, so that he can keep his eyes on the road while making any adjustments desired or necessary.

A further feature of the invention consists in the fact that my novel device is simple and economical to manufacture, simple to instal, and positive and efficient in operation.

The above and other objects of the invention, details of construction, combinations of parts and advantages, will be hereinafter more fully pointed out, described and claimed.

Referring to the drawings, illustrating a preferred embodiment of the present invention, Fig. 1 is a side elevation of an automobile engine and sectional view of a dashboard, illustrating my novel control in operative position;

Fig. 2 is a plan section on the line 2—2 of Fig. 1;

Fig. 3 is a fragmentary view of the instrument panel of a Ford automobile, illustrating the location of the controlling handle and attaching shield or bracket;

Fig. 4 is a fragmentary central sectional view, on an enlarged scale, of the device; and Fig. 5 is a cross-sectional view on the line 5—5 of Fig. 4.

Referring now to the drawings, for a particular description of the invention, my invention comprises a metallic tube 1 having thereon a bracket or shield 2 for attachment to the bottom of an instrument panel 3 on the dash 4 of an automobile. The handle 5, preferably knurled for convenience in operating, has a hollow stem 6 surrounding one end of the tube 1 and having secured therein one end of a flexible element 7, this element preferably comprising a spirally wound wire or wires.

Means, such as nuts 8, are provided on the tube 1 for attaching same to the partition 9. These nuts are threaded on a threaded sleeve 10 which is firmly affixed to the tube 1.

The lower end of the flexible element 7 is free of the tube 1, and carries a hollow sleeve 11 firmly secured or fixed thereto, this sleeve 11 carrying a set screw 12. The sleeve 11 is adapted to be slid over one end of the carburetor control lever or arm 13, the set screw 12 firmly holding said sleeve to said arm.

A pull or push on the lever 13 will adjust the choke arm 14, while a rotation of said lever 13, through rotation of the operating handle and element 7, will adjust the mixture passing through the carburetor 15.

The tube 1 is bent, as clearly illustrated in Fig. 2, to laterally offset the operating handle 5 from the carburetor 15, and thus to bring the handle 5 within easy reach of the operator.

Should the operator desire to "choke" the carburetor, a pull on the handle 5 will pull the flexible element through the tube 1, which will operate the choke lever 14. After the engine has warmed up, the handle can be adjusted to any desired position, either all the way back to normal position, or at any position intermediate full choke and normal closed position.

Should the operator desire to adjust the mixture, the handle 5 may be rotated, in one direction to "rich" the mixture, or in the opposite direction to "lean" the mixture.

It will thus be seen that I have devised an extremely simple mechanism to perform a plurality of operations, and by reason of the flexibility of the element 7 and the lateral offset feature of the operating handle 5, said handle may be placed within easy reach of the operator regardless of the position of the carburetor or other object being controlled.

I believe that this device is novel, and have therefore claimed the same broadly in the present application.

While I have necessarily described my present invention somewhat in detail, it will be appreciated that I may vary the size, shape and arrangement of parts within reasonably wide limits without departing from the spirit of the invention.

My invention is further described and defined in the form of a claim as follows:

In a device of the kind described, a tube, means on said tube to secure same to the dash of an automobile, a flexible element guided by said tube, a sleeve carried by one end of said element and having a set screw therein for attachment of said sleeve to the article to be controlled by said flexible element, an operating handle at the opposite end of said flexible element for rotating and reciprocating said element, said handle being offset from the article to be controlled, a hollow stem projecting from said handle and slidably mounted over one end of said tube, the interior of said stem adjacent to said handle being of less diameter than the remainder of the interior of said stem, one end of said flexible element being secured in said reduced diameter portion of said stem.

In testimony whereof, I have signed my name to this specification.

ALFRED F. JACKSON.